United States Patent
Fuller et al.

(10) Patent No.: US 9,523,977 B2
(45) Date of Patent: Dec. 20, 2016

(54) BARCODE MENU STRUCTURE ADVANCEMENT

(71) Applicant: Cubic Corporation, San Diego, CA (US)

(72) Inventors: Sean Fuller, Tullahoma, TN (US); Sean Cahill, Tullahoma, TN (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/040,239

(22) Filed: Feb. 10, 2016

(65) Prior Publication Data

US 2016/0231722 A1    Aug. 11, 2016

Related U.S. Application Data

(60) Provisional application No. 62/114,967, filed on Feb. 11, 2015.

(51) Int. Cl.
| | |
|---|---|
| G06F 7/08 | (2006.01) |
| G05B 19/042 | (2006.01) |
| G06F 3/0484 | (2013.01) |
| G06F 3/0482 | (2013.01) |
| G06K 19/06 | (2006.01) |

(Continued)

(52) U.S. Cl.
CPC .......... *G05B 19/042* (2013.01); *G06F 3/0482* (2013.01); *G06F 3/04842* (2013.01); *G06K 19/06028* (2013.01); *G06K 19/06037* (2013.01); *G06Q 30/0621* (2013.01); *G07F 19/20* (2013.01); *G05B 2219/2645* (2013.01)

(58) Field of Classification Search
USPC ........................................ 235/381, 384, 383
See application file for complete search history.

(56) References Cited

U.S. PATENT DOCUMENTS

| | | | | |
|---|---|---|---|---|
| 2013/0166441 | A1* | 6/2013 | Kobylkin | G06Q 20/354 705/39 |
| 2015/0356532 | A1* | 12/2015 | Gotanda | G06Q 20/14 705/39 |
| 2016/0180311 | A1* | 6/2016 | Tung | G06Q 20/20 705/15 |

OTHER PUBLICATIONS

Drobnik; "Barcodes with iOS—Bringing together the digital and physical worlds"; Jun. 5, 2014; Manning Publications, ISBN: 978-1-61729-215-6; vol. MEAP, Version 3; all pages.

(Continued)

*Primary Examiner* — Ahshik Kim
(74) *Attorney, Agent, or Firm* — Kilpatrick Townsend & Stockton LLP

(57) ABSTRACT

A method for dispensing products from a vending machine includes presenting a start screen of a user interface including menu options associated with a selection of a product. A first interaction associated with the menu options is received and recorded for use in generating an identifier. Additional interactions are received and recorded for use in generating the identifier. Each of the additional interactions corresponds to a selection made a unique sub menu of a plurality of sub menus. The additional interactions are associated with the selection of the product. A last interaction of the additional interactions determines the product to be purchased. An identifier is generated based on the recorded first interaction and the recorded at least one additional interaction. The identifier represents a sequential mapping of the first interaction and the additional interactions. The product and the identifier are provided to a user of the vending machine.

20 Claims, 10 Drawing Sheets

(51) Int. Cl.
*G07F 19/00* (2006.01)
*G06Q 30/06* (2012.01)

(56) References Cited

OTHER PUBLICATIONS

Langer, et al.; "Awendungen and Technik von Near Field Communication (NFC)"; Springer Berlin Heidelberg, Berlin, Heidelberg; Sep. 16, 2010 ;ISBN: 978-3-64-205497-6; all pages.
Wikipedia; "Point of sale" Internet article; Feb. 4, 2015; Retrieved on Apr. 6, 2016 from <https://en.wikipedia.org/w/index.php?title=Point_of_sale&oldid=645652715>.
Wikipedia; "Payment terminal"; Internet Article; Jan. 3, 2015; Retrieved on Apr. 6, 2016 from <https://en.wikipedia.org/w/index.php?title=Payment_terminal&oldid=640727825>.
Wikipedia; "Mobile device"; Internet article; Feb. 3, 2015; Retrieved on Apr. 6, 2016 from <https://en.wikipedia.org/w/index.php?title=Mobile_device&oldid=645407627>.
Wikipedia; "Mobile payment"; Internet article; Dec. 29, 2014; Retrieved on Apr. 6, 2016 from <https://en.wikipedia.org/w/index.php?title=Mobile_payment&oldid=640127252>.
Wolfgang, et al.; "Smart Card Handbook, 4th edition"; Jul. 19, 2010; Wiley; ISBN: 978-0-47-074367-6; pp. 735-746.
International Search Report and Written Opinion mailed on Apr. 18, 2016 for International Application No. PCT/US2016/017535; all pages.

\* cited by examiner

900

BARCODE MENU STRUCTURE ADVANCEMENT

CROSS-REFERENCES TO RELATED APPLICATIONS

This Application claims priority to U.S. Provisional Patent Application No. 62/114,967 filed Feb. 11, 2015, entitled "BARCODE MENU STRUCTURE ADVANCEMENT," the entire disclosure of which is hereby incorporated by reference, for all purposes, as if fully set forth herein.

BACKGROUND OF THE INVENTION

Conventional vending machines used in transit applications use touchscreens and/or button interfaces to make selections through a menu structure. As vending machines become more advanced and are capable of dispensing larger varieties of products, the menus used to select products may be very complex and include many layers of menus. Such menus may be confusing and time consuming for users to navigate. This results in displeased customers, longer wait times at vending machines, and/or more incorrect products being dispensed.

BRIEF SUMMARY OF THE INVENTION

Embodiments generate a pre-generated barcode or other identifier to enable quick and accurate ordering of the same product during a subsequent transaction with a vending machine. The barcodes may represent a mapping of the user's actual interactions, such as menu selections, at the vending machine and may be issued along with a product dispensed from the vending machine. During a subsequent use of the vending machine, a user may scan the barcode at the vending machine, and the vending machine may process the identifier as though the user was actually interacting with a menu of the vending machine display. In this manner, the vending machine may emulate the user's previous transaction to locate and provide the previously purchased item for purchase.

In one aspect, a method for dispensing products from a vending machine is provided. The method may include presenting a start screen of a user interface on display of a vending machine. The start screen may include menu options associated with a selection of a product to be purchased. The method may also include receiving, at the vending machine, a first interaction associated with the menu options of the start screen and recording, at the vending machine, the first interaction for use in generating an identifier. The method may further include receiving, at the vending machine, at least one additional interaction. Each of the at least one interaction may correspond to a selection made a unique sub menu of a plurality of sub menus. The at least one additional interaction may be associated with the selection of the product. A last interaction of the at least one additional interaction may determine the product to be purchased. The method may include recording, at the vending machine, each of the a least one additional interaction for use in generating the identifier. The method also include generating, by the vending machine, an identifier based on the recorded first interaction and the recorded at least one additional interaction. The identifier may represent a sequential mapping of the first interaction and the at least one additional interaction. The method may further include providing the product and the identifier to a user of the vending machine.

In another aspect, a non-transitory computer-readable medium having instructions embedded thereon for dispensing products from a vending machine. The instructions may include computer code for causing a computing device to present a start screen of a user interface on display of a vending machine. The start screen may include menu options associated with a selection of a product to be purchased. The instructions may also include computer code for causing a computing device to receive, at the vending machine, a first interaction associated with the menu options of the start screen. The instructions may further include computer code for causing a computing device to record, at the vending machine, the first interaction for use in generating an identifier. The instructions may include computer code for causing a computing device to receive, at the vending machine, at least one additional interaction. Each of the at least one interaction may correspond to a selection made a unique sub menu of a plurality of sub menus. The at least one additional interaction may be associated with the selection of the product. A last interaction of the at least one additional interaction may determine the product to be purchased. The instructions may include computer code for causing a computing device to record, at the vending machine, each of the a least one additional interaction for use in generating the identifier. The instructions may also include computer code for causing a computing device to generate, by the vending machine, an identifier based on the recorded first interaction and the recorded at least one additional interaction. The identifier may represent a sequential mapping of the first interaction and the at least one additional interaction. The instructions may further include computer code for causing a computing device to provide the product and the identifier to a user of the vending machine.

In another aspect, a vending machine is provided. The vending machine may include a display, a user interface presented on the display, a memory, and a processor. The processor may be configured to present a start screen of the user interface. The start screen may include menu options associated with a selection of a product to be purchased. The processor also may be configured to receive a first interaction associated with the menu options of the start screen and to record the first interaction for use in generating an identifier. The processor may be further configured to receive at least one additional interaction. Each of the at least one interaction may correspond to a selection made a unique sub menu of a plurality of sub menus. The at least one additional interaction may be associated with the selection of the product. A last interaction of the at least one additional interaction may determine the product to be purchased. The processor may be configured to record each of the a least one additional interaction for use in generating the identifier. The processor may also be configured to generate an identifier based on the recorded first interaction and the recorded at least one additional interaction. The identifier may represent a sequential mapping of the first interaction and the at least one additional interaction. The processor may be further configured to, at a first time, provide the product and the identifier to a user of the vending machine. The processor may be configured to receive, at a second time, the identifier at the vending machine. The processor may also be configured to determine an order of interactions represented by the identifier. The processor may be further configured to process interactions matching the first interaction and the at least one additional interaction without rendering corresponding screens for the one or more sub menus. The processor may be configured to identify the product based on the processed interactions.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The current invention relates generally to the use of a pre-generated barcode to advance through a set menu items quickly and accurately in a vending application, although embodiments and applications are not so limited. Embodiments can include, for example, any menu-structured vendor. The use of these barcodes may be user independent, repeatable, and disconnected from any payment setup. Having no connection to a payment system also makes the barcode completely insulated from monetary fraud.

The barcode may be generated in a number of ways. For example, barcodes may be printed on a ticket and/or receipt after purchase is complete. The barcodes, if scanned, will allow the user to make an exact copy of a previous purchase. In other embodiments, a barcode may be may be selected using a mobile application and/or web application. The barcode may be printed for use at the terminal and/or an image of the barcode is then presented at the terminal using a mobile device to display the barcode.

Accordingly, embodiments of the invention can allow user to navigate through the menu structure quickly, efficiently, and with minimal touching of any vending or other machine. As the generated barcode is not connected to a payment system, there is no need to generate a unique code for each transaction. Because of this, a finite number of barcodes can be used to define all the choices for any given menu structure. Thus, the same barcode may be generated and used for the same selections through the menu structure.

The barcodes generated using the systems and methods described herein may also enable faster transaction times while reducing transaction error rates. This may lead to reduced queue waiting times and crowd mitigation. Quicker transactions reduce vulnerability time. For example, while selecting a product to be vended, a user may be focused on the vending machine and have his back facing outward and be unable to see criminals or other threats. The quicker the selection process, the less time the user has his back turned toward any threats and focus diverted from such threats. Further, the use of barcodes may reduce and/or eliminate the need to physically touch the vending or other machine, thus reducing the transmission of germs and other contaminants. All of these factors may improve an overall user experience.

In some embodiments, the identifier may be utilized in conjunction with an RFID chip, NFC communication transmission, Bluetooth®, and/or other contactless transmission method to transmit and receive similar data. For example, the identifier may be provided as a transmittable data packet that may be communicated from the vending machine to a mobile device and vice versa using a one or more of the above transmission methods. The identifier may also be utilized in conjunction with data on a magnetic strip, quick response (QR) code, and/or the like.

Figure 1:
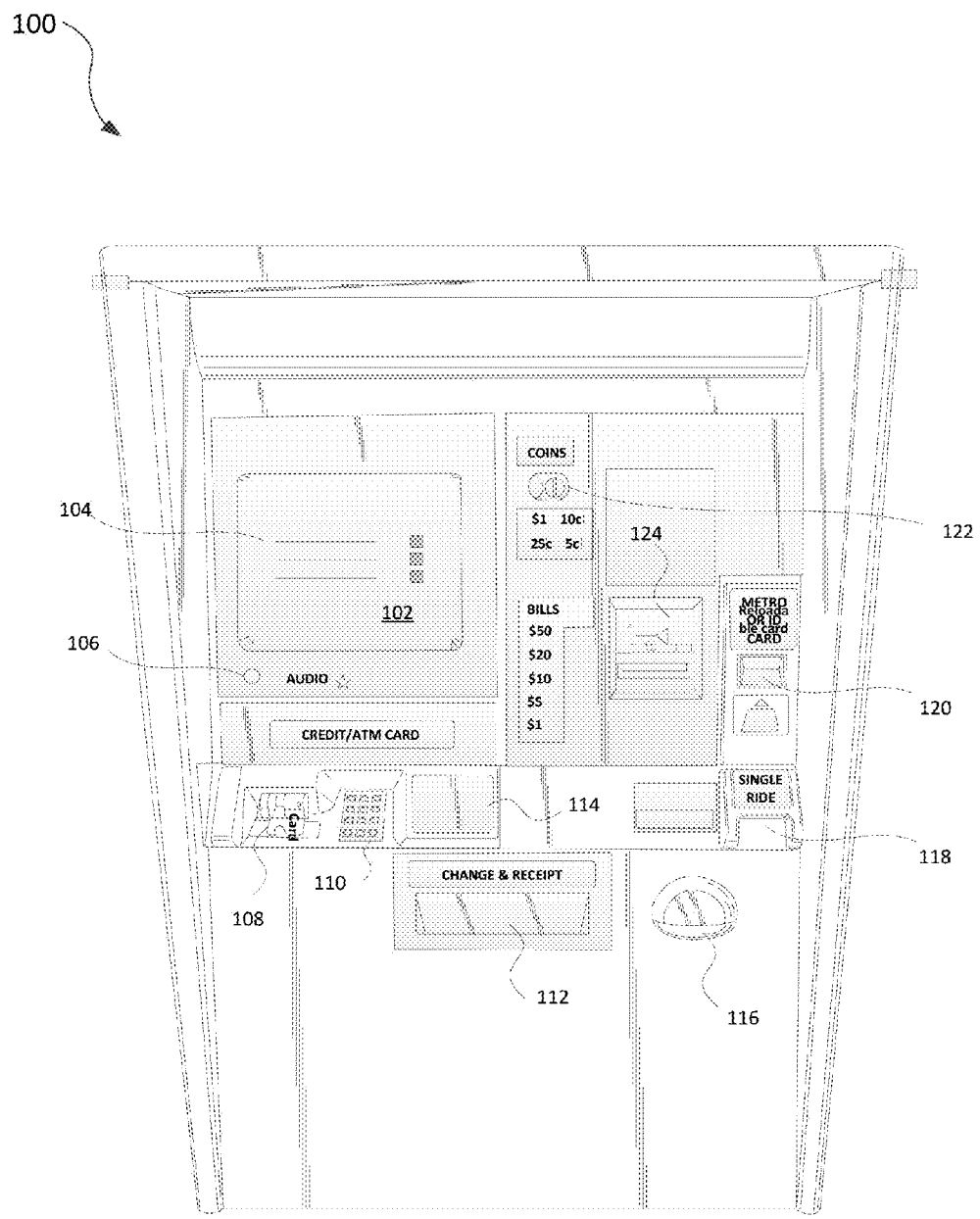
FIG. 1 depicts a vending machine according to embodiments.

Turning now to FIG. 1, one embodiment of a vending machine 100 is shown. Vending machine 100 may include one or more displays 102 on which information related to products and/or services available from a selected remote source, details related to the transaction, instructions on conducting transactions, videos, and/or any other information may be provided. In some embodiments, vending machine 100 may have a first screen configured to display a user interface to conduct transactions, while a second screen is used to provide instructions and/or host videos, such as video communications with an agent of a ticket office of a transit system. In other embodiments, a single display 102 may be used for displaying all available content. Vending machine 100 may also include one or more input interfaces. For example, input interfaces may include a keypad 110, a touchscreen 104 on display 102, a voice command device such as a microphone, and/or any other mechanisms for allowing a user to input information. One or more payment readers may be included on vending machine 100. For example, payment readers may include a cash reader 124, a coin reader 122, a credit and/or debit card reader 108, other payment reader 114, such as a bar code and/or QR code scanner or near field communication (NFC) device other radio frequency identification (RFID) antenna, Wi-Fi antenna, Bluetooth® antenna, and/or any other device configured to read information stored on a payment medium.

In some embodiments, other payment reader 114 may also be configured to read various types of fare media, such as smart cards, mobile devices, and other fare media. A fare media and/or identification (ID) card reader 120 may also be provided. Vending machine 100 may include one or more printers and/or data writers for printing transaction items such as entry tickets, boarding passes, confirmation tickets, vouchers, receipts, identifiers such as barcodes and QR codes, and/or any other documentation related to a transaction. For example, a receipt printer 112 may be used to issue receipts of payments, refunds, and/or other transactions. A fare media printer or writer 118 may be included to issue fare media, such as single ride tickets, smart cards, monthly passes, and the like. In some embodiments, change may be returned to a user in coin tray 116 and/or a cash dispenser. In some embodiments, cash dispenser may be a separate component, while in other embodiments, cash returns may be dispensed near receipt printer 112. In some embodiments, transaction items, such as transit media and receipts, will be issued electronically, rather than a printed hard copy being provided. Vending machine 100 may also include a camera, a speaker 106, and/or other audio/visual components to enable audio and/or video communication with a ticket office. Each of the components of the vending machine 100 may be controlled by the vending machine 100 locally, or remotely by the ticket office, such as when the vending machine is in a remote expert mode as described herein. Vending machine 100 may be operated in a passenger mode where a user may approach the vending machine 100 and interact with the vending machine in person and/or in a remote expert mode where an agent from a ticket office controls the software and/or hardware peripherals of the machine, such as when a user needs help completing a transaction.

Figure 2:
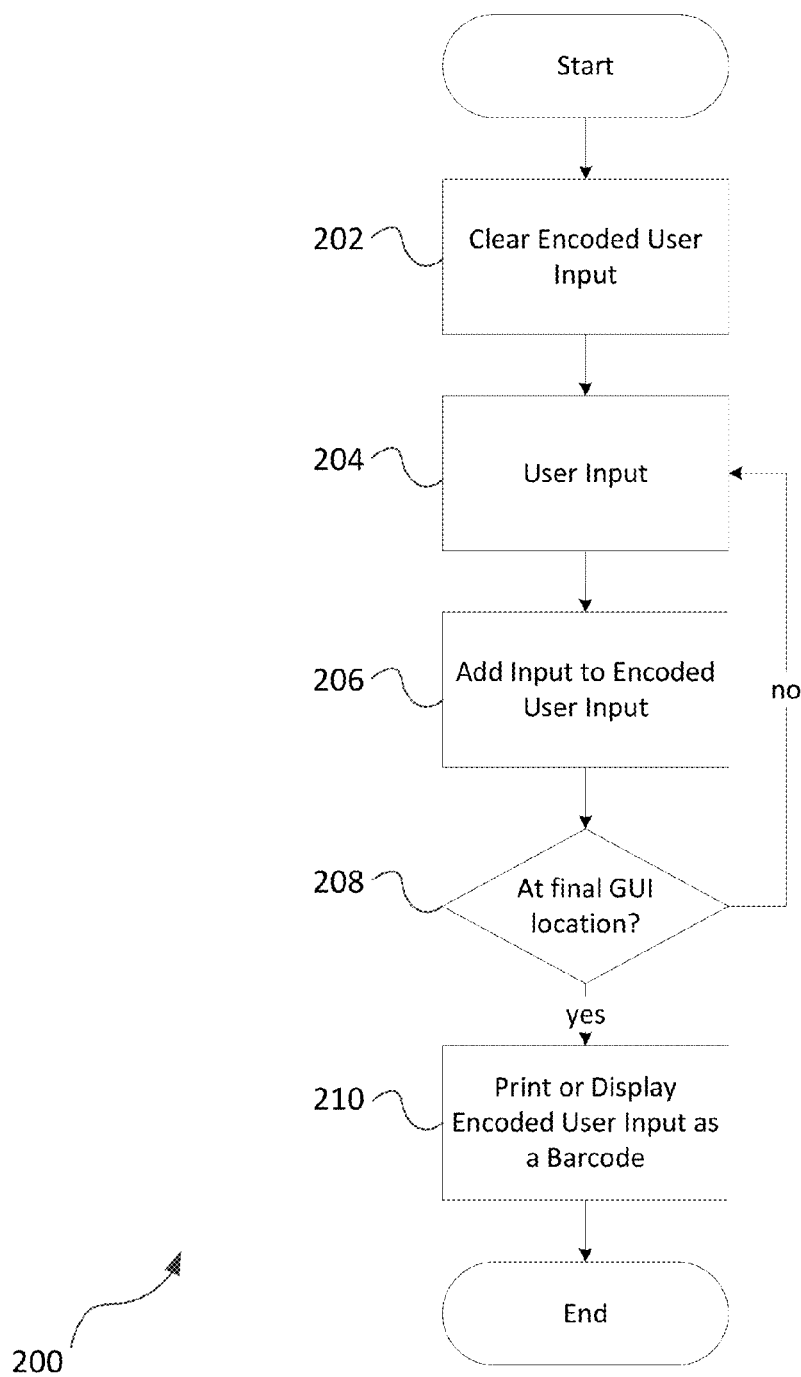
FIG. 2 depicts a process for generating a barcode or other identifier for a vending machine product according to embodiments.

FIG. 2 depicts a process 200 for generating a barcode or other identifier at a vending machine, such as vending machine 100. At block 202, an encoded user input may be cleared. For example, a previous customer's interactions may be cleared from memory, such as a RAM of the vending machine. In some embodiments, a start screen of a product selection menu may be presented to a new user. A user input received at the start screen may be detected at block 204. This may involve a user interacting with a touchscreen, a button, and/or other input device of the vending machine as part of a selection process for a product. As one example, a transit vending machine may provide a start screen that prompts a user to select a type of transit fare. For example, the user may choose between a one-zone ticket, a two-zone ticket, and the like. This input may be recorded and added to an encoded user input for the transaction at block 206. Continuing with the transit example, if the user selects the two-zone ticket, an appropriate identifier bit may be recorded. For example, the one-zone ticket may be represented by the number "1" and the two-zone ticket may be represented by the number "2." When the user selects the two-zone ticket, a "2" may be recorded as the first identifier bit. At block 208, a determination as to whether a final graphical user interface (GUI) has been reached. In some embodiments, the final GUI may be a screen displaying a single product and/or a payment screen for the single product. If the final GUI has not been reached, then the process will return to block 204 and the vending machine may monitor additional inputs, which may each have an identifier bit associated therewith. Identifier bits associated with these inputs will then be sequentially added to the encoded user input at block 206. This process will repeat until the final GUI is detected. In this manner, the encoded user input may include a string of identifier bits forming a single identifier. This identifier then effectively represents each input of the user in selecting a product to be dispensed. In some embodiments, the identifier may be in the form of a barcode, a QR code, and/or other visual identifier. In other embodiments, the identifier may be stored in a data packet readable by a user's mobile device. The identifier may be printed on the product and/or on a receipt issued by the vending machine and/or the identifier may be electronically communicated to a user's mobile device, such as a smart phone at block 210. The identifier is then useable by the vending machine or other vending machine having a same menu selection process and same identifier bits to repurchase the same product on a subsequent use of the vending machine.

Figure 3:
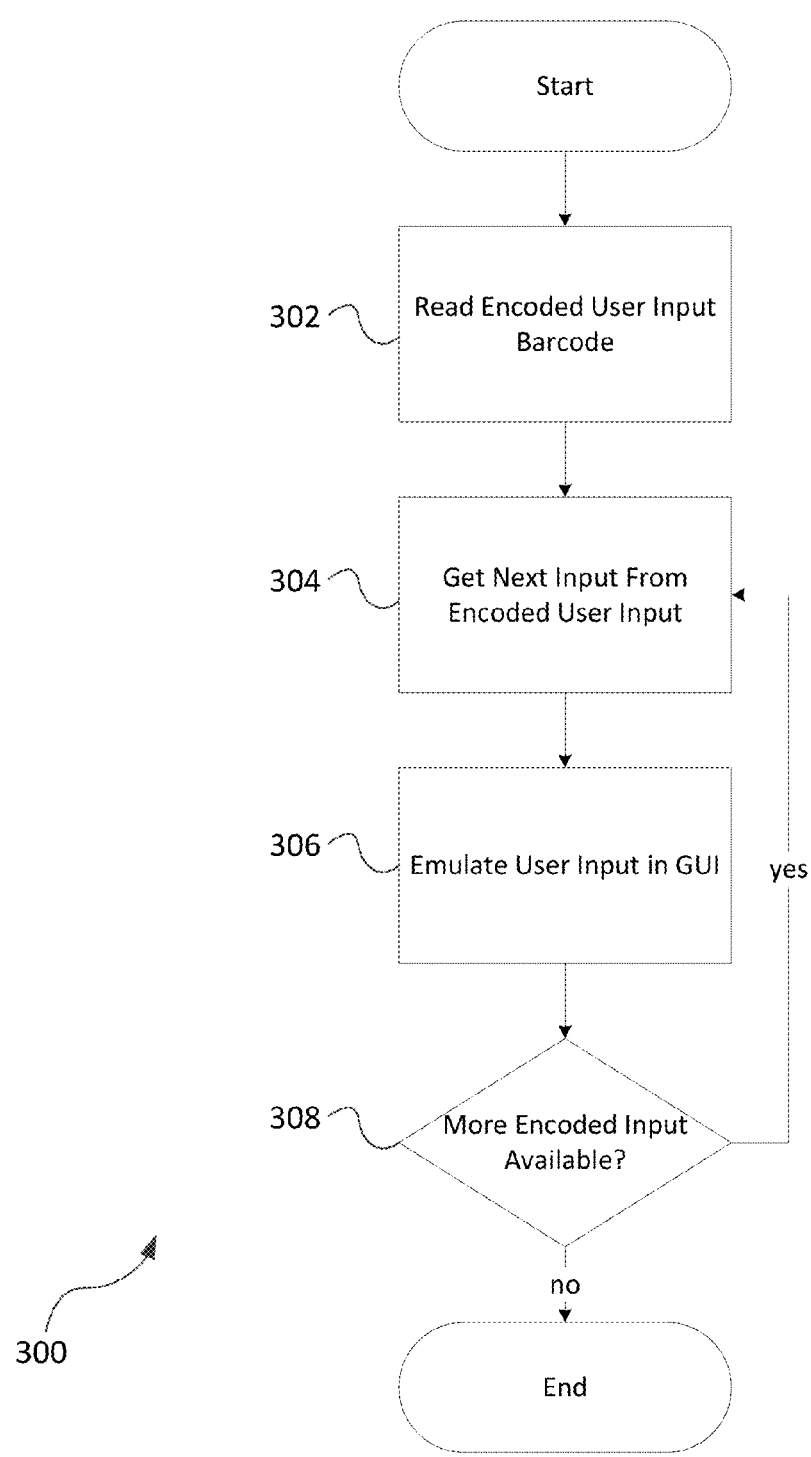
FIG. 3 depicts a depicts a process for redeeming a barcode or other identifier for a product at a vending machine according to embodiments.

Such a redemption process 300 is shown in FIG. 3. Process 300 may begin with a vending machine reading an encoded user input at block 302, such as the identifier generated in process 200. This may be done, for example, by a user presenting a barcode or QR code to a reader device of the vending machine such that the identifier may be read by the vending machine. For example, the user may present a receipt for the previous transaction that contains a barcode with the identifier on it. In other embodiments, eh identifier may be provided by the user's mobile device. For example, the mobile device may display a barcode or QR code containing the identifier, which may be scanned by the reader device of the vending machine. In other embodiments, the identifier may be in a data packet stored on the mobile device. Wireless communications, such as those using 3G, 4G, NFC, RFID, Bluetooth®, and/or other wireless antennas may be used to wirelessly transmit the identifier from the mobile device to the vending machine. At block 304, the vending machine may process the identifier to get a next input from the encoded user input. This may be done by the vending machine reading a first bit of the identifier or encoded user input. The vending machine may interpret the first identifier bit as being the user's initial input with GUI of the vending machine parsing the identifier and processing the bit as such to emulate the user's interaction with the GUI. At block 306, a determination is made as to whether there is more encoded input available in the identifier. If not, a next identifier bit is processed at block 304 and an additional user input is emulated at block 306. Once it is determined that there is no more encoded input available (each identifier bit of the identifier has been analyzed), process 300 may end and a screen for the previously purchased product is shown. In some embodiments, this may be a payment screen associated with the product, which may, in some embodiments, have a predetermined payment form selected as determined from a corresponding identifier bit.

It will be appreciated that in most embodiments, the emulation of user inputs at a GUI does not cause the corresponding GUI to be updated to show the various steps of locating the product. By not rendering each screen of the selection process, the vending machine may more efficiently locate and process a product to be dispensed, as the processing unit(s) of the vending machine do not have to process the graphical elements of the GUI, nor do the processors need to load database and other information to be displayed on the screen. This allows the products to be located and dispensed much more efficiently, as a significantly lesser amount of information must be processed.

Figure 4:
FIG. 4 depicts a vending machine menu hierarchy according to embodiments.

FIG. 4 depicts a decision tree or hierarchy of one embodiment of a vending machine menu. The decision tree demonstrates how a identifier is generated based on a user's interactions with a vending machine menu, such as one presented on a user interface of vending machine 100. A start screen, such as a choose ride type menu 400 may be presented on the user interface. For example, the choose ride type menu 400 may include several different ride type options. Here, a one-zone fare 402, a two-zone fare 404, a zone upgrade 406, a transfer 408 and/or other ride type may be included. Each of the options for selection may include a unique identifier bit 410. For example, the identifier bit 410 for a one-zone fare 402 is "1," with each subsequent menu option having an identifier bit 410 incremented up by 1. Upon selecting a ride type, the user may be prompted with a number of riders selection 412 on the user interface. Here, an identifier bit 414 may be determined based on a number of riders keyed into the number of riders selection 412. For example, if a user is purchasing only a fare for himself, the identifier bit 414 would be "1," while a purchase for 3 riders would result in identifier bit 414 being "3." In some embodiments, rather than having a field allowing a user to input a number, the user may be presented with a menu of rider choices. For example, a number of riders between 1 and 6 (or any other number) could be presented as options, with each number having an identifier bit corresponding to the number of riders.

After the number of riders is selected, a type of rider may be selected. For example, different prices and/or tickets may be available for an adult fare 416, a child fare 418, a senior fare 420, a disabled person fare 422, and/or other characterization of rider. Each of these rider types may have a corresponding identifier bit 424. In some embodiments, the rider number and rider type menus may be tied together, such as by providing them on the same screen. This may allow a user to select multiple rider types in a single transaction, as well as a quantity of riders for each of the selected rider types. Upon choosing a rider type, the use may be prompted to select from a number of payment options. For example, the user may select from cash 426, debit 428, credit 430, and/or other payment options, such as using a mobile wallet or other payment form. Each of the payment options may include its own unique identifier bit 432.

The decision tree may be traversed from the top to bottom to generate an identifier for a particular transaction. For example, a user may wish purchase 3 adult, two-zone tickets and pay with cash. The user may interact with the vending machine menu to first select two-zone fare 404 by inputting "2." The use may then be prompted to enter a number of riders. Here the user may enter "3," such as by keying in the amount using a keyboard or touchscreen keypad. The user may then enter "1" on a rider type sub menu to select adult fare 416. A payment screen may be presented, where the user may enter "1" for cash 426. Upon reaching a final screen, such as a payment or issuance screen, an identifier is generated based on the identifier bits of each of the user's selections. For the 3 adult, two-zone tickets cash payment transaction, this identifier would be "2311."

As another example, a user may wish to purchase a single senior transfer ticket with a credit card. The corresponding identifier would be "4133." In this manner, an identifier, which may be represented by a barcode, QR code, or electronic data packet, may be generated dynamically as a user interacts with a machine. Thus, when the identifier is read by the vending machine in a subsequent transaction, the vending machine may parse out each individual identifier bit and emulate the user's previous transaction to complete a transaction for the exact same item. For example, when the identifier "2322" is read by the vending machine, the vending machine traverses the decision tree to determine a corresponding product. Here, the vending machine reads the first "2" as corresponding to a two-zone fare 404. The "3" represents three riders, and the second "2" corresponds to child fare 418. The final "2" represents a debit 428 payment. In this manner, the vending machine is able to determine that the received identifier "2322" represents three child two-zone fares paid for with a debit card.

In some instances, a user may make a mistake in his selections and need to back up. In some embodiments, a back button be used and may have an identifier bit. Here, "5" may be the identifier bit for the back button. The vending machine may treat "5" as effectively clearing an identifier bit preceding the "5." If two consecutive "5's" are read, the vending machine may clear the two identifier bit immediately preceding the two "5's," with similar steps done for additional "5's." As one example, the vending machine may read an identifier as "23522511." Here, the vending machine determines that the first "2" corresponds to a two-zone fare 404. The "3" may be for three riders. The vending machine reads the first "5" and determines that the number of riders selection should be cleared. The second "2" then is determined to be two riders. The final "2" is then read as child fare 418. The vending machine may then read the second "5" and determine to clear the child fare 418. The first "1" then results in a selection of an adult fare 416. The final "1" then is for a cash 426 payment. Thus, the vending machine reads "23522511" as two two-zone adult fares with a cash payment. In some embodiments, rather than generate an identifier with the identifier bits for the back button, the vending machine may truncate the identifier during generation of the identifier by removing these identifier bits, as well as those which are being cleared. For example, during the generation of the identifier, the vending machine may detect the presence of the "5's" and then determine that these should be deleted, as well as the "3" and "2" preceding the "5's." Thus, the generated identifier would be "2211." Such truncation reduces the load on the vending machine during the redemption process, thus allowing the vending machine to process the product request more quickly.

Further, by dynamically generating identifiers at a vending machine based on a user's interactions, not only is the speed and efficiency of the transaction increased and the load on the vending machine processor reduced, but the need for a central database of identifiers is eliminated, as is the need to communicate with another vending machine or server to determine which identifier to issue based on a selected product and/or which product to issue based on a redeemed identifier. All of the processing may be done locally by merely emulating the user's interactions using the available menu, which further increases the processing speed by reducing the amount of information to be requested, received, and processed, as well as eliminating the communication time with a remote networked device.

Additionally, the identifiers and barcodes generated herein are distinct from a UPC or other identifier in that the present identifiers are not product-specific, but rather specific to a particular mapping of a customer's interaction with the vending machine. There is no need to match a barcode to a particular product, as each vending machine may traverse each bit of the identifier to determine the customer's interactions and arrive at a desired product, without the need to poll large databases of barcodes. This further reduces the amount of data storage space needed. Such dynamic barcode generation enables two users to generate two unique barcodes that lead to the issuance of an identical product.

While depicted here as a transit vending machine menu, it will be appreciated that similar decision trees may exist for vending machines in other applications. Decision trees may be more simple or more complex than those shown herein, with the options of each menu being based on factors such as the number of available products for purchase from the vending machine and the like. For example, each selection may provide a different set of options than another selection. Additionally, while shown here with identifier bits repeating, starting at 1 at each level of the tree, it will be appreciated that other systems may be utilized to identify each selection. As just one example, rather than integers, other characters, such as letters, special characters, and the like may be used as identifier bits. Additionally, the identifier bits may be arranged numerically, alphabetically, in another patterned arrangement, and/or randomly assigned.

Figure 5:
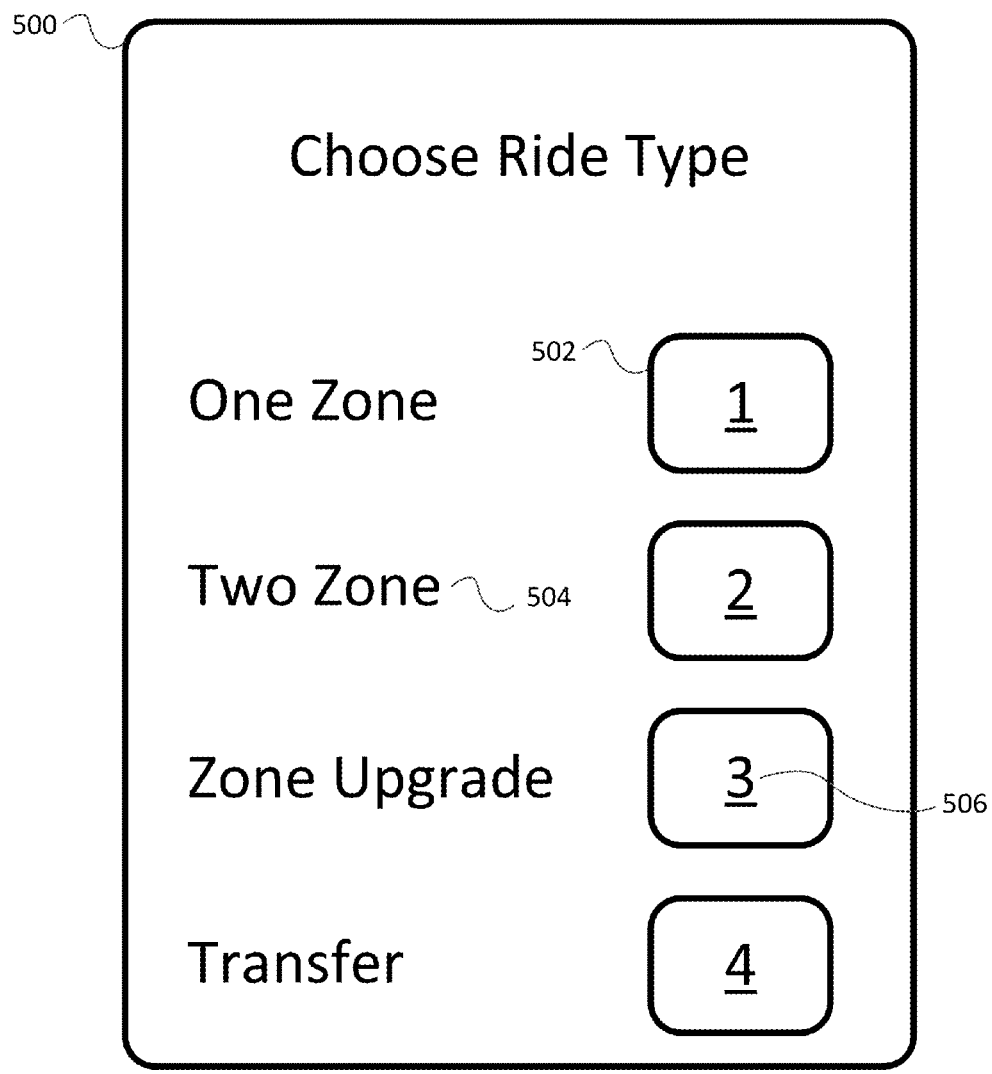
FIG. 5 depicts a start screen of a vending machine menu according to embodiments.

FIG. 5 depicts an example of a simplified start screen 500. Start screen 500 may be used to start the selection process for a vending machine product. Start screen 500 may be used in conjunction with the decision tree of FIG. 4. Here, the start screen 500 allows a user to interact with one of a number of buttons 502 that each correspond to a product option 504. Here, product options 504 include a one-zone fare, a two-zone fare, a zone upgrade, and a transfer, although other options may be used based on the various products offered. A user may interact with one of the buttons 502 to select a product option 504, such as by pushing one of the buttons 502, which may be part of a keypad and/or may be a portion of a touchscreen display of the vending machine. Each button 502 includes an identifier bit 506 that is used by the vending machine to record each input of the user. While shown with identifier bits 506 on their representative buttons 502, it will be appreciated that in some embodiments, the identifier bits will merely be recognized by the vending machine and may not be displayed anywhere for the user.

Figure 6:
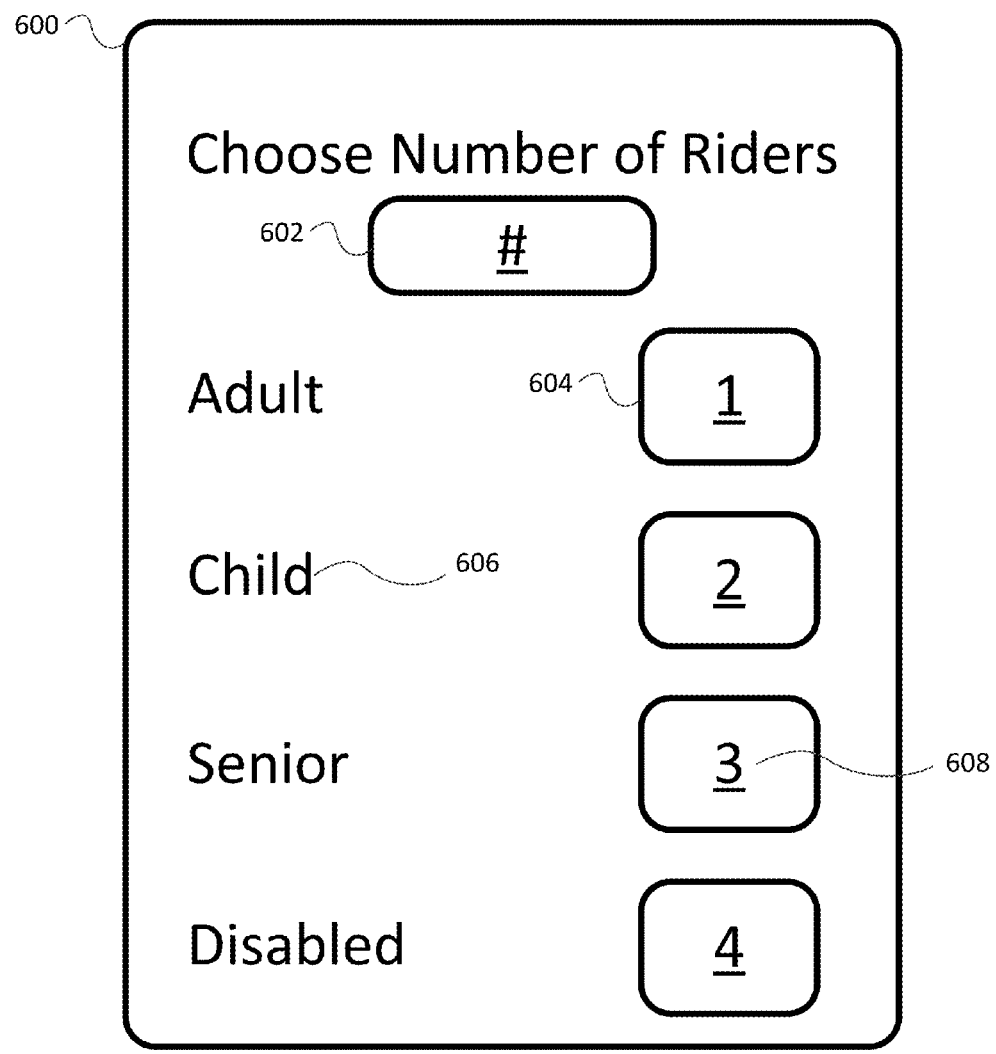
FIG. 6 depicts a rider selection screen of a vending machine menu according to embodiments.

FIG. 6 depicts an example of a simplified rider selection screen 600. Rider selection screen 600 may be used to select a number and/or type of riders for a transit product. Rider selection screen 600 may be used in conjunction with the decision tree of FIG. 4. Here, the rider selection screen 600 includes a number of rider data field 602. The user may enter or otherwise select a number of users for a transit product, such as by entering a number from a keypad or from the touchscreen display. The entered number may be used as an identifier bit for the rider data field 602. The rider selection screen 600 allows a user to interact with one of a number of buttons 604 that each correspond to a rider type 606. Here, rider types 606 include an adult fare, a child fare, a senior fare, and a disabled fare, although other options may be used based on the various products offered. A user may interact with one of the buttons 604 to select a rider type 606, such as by pushing one of the buttons 604, which may be part of a keypad and/or may be a portion of a touchscreen display of the vending machine. Each button 604 includes an identifier bit 608 that is used by the vending machine to record each input of the user. While shown with identifier bits 608 on their representative buttons 604, it will be appreciated that in some embodiments, the identifier bits will merely be recognized by the vending machine and may not be displayed anywhere for the user.

Figure 7:
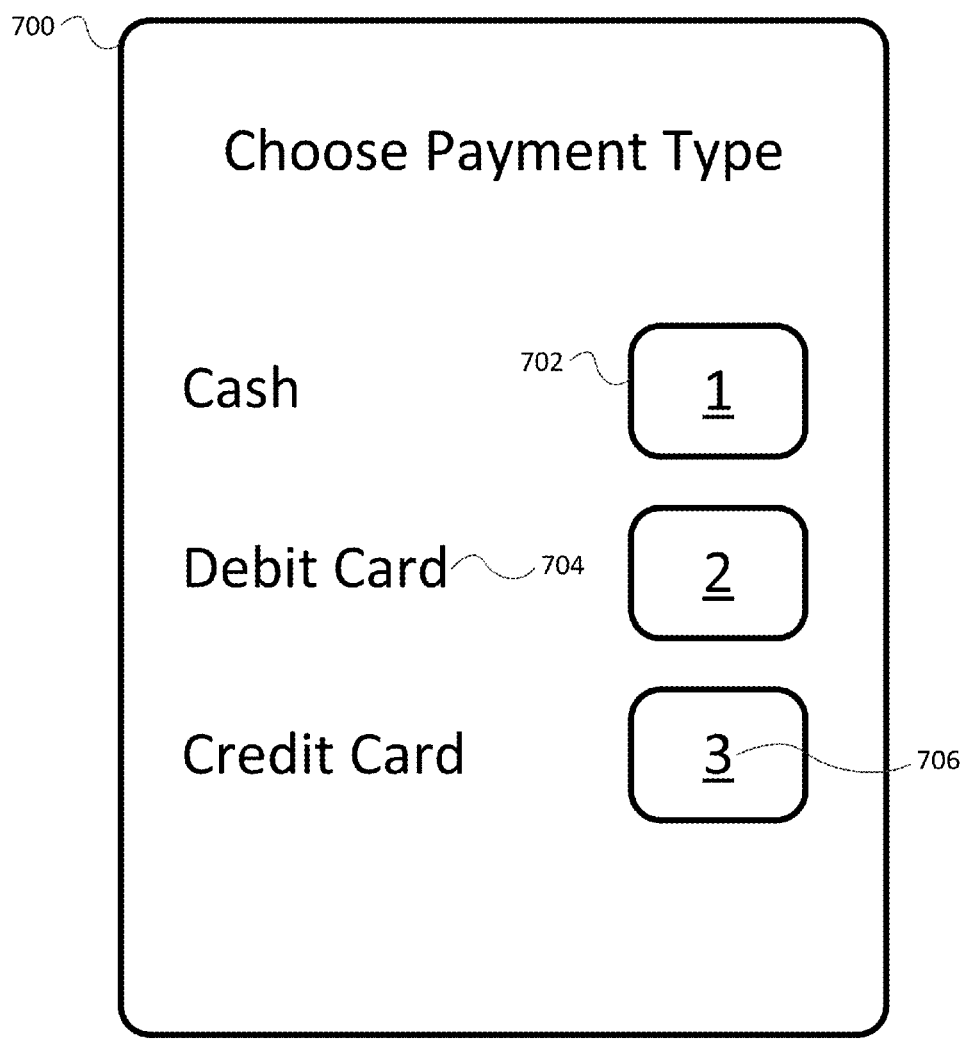
FIG. 7 depicts a payment method screen of a vending machine menu according to embodiments.

FIG. 7 depicts an example of a simplified payment selection screen 700. Payment selection screen 700 may be used to select a type of payment for a transit product. Payment selection screen 700 may be used in conjunction with the decision tree of FIG. 4. Here, the payment selection screen 700 allows a user to interact with one of a number of buttons 702 that each correspond to a payment type 704. Here, payment types 704 include cash, debit, and credit, although other options may be used based on the various payment options supported. A user may interact with one of the buttons 702 to select a payment type 704, such as by pushing one of the buttons 702, which may be part of a keypad and/or may be a portion of a touchscreen display of the vending machine. Each button 702 includes an identifier bit 706 that is used by the vending machine to record each input of the user. While shown with identifier bits 706 on their representative buttons 702, it will be appreciated that in some embodiments, the identifier bits will merely be recognized by the vending machine and may not be displayed anywhere for the user.

Figure 8:
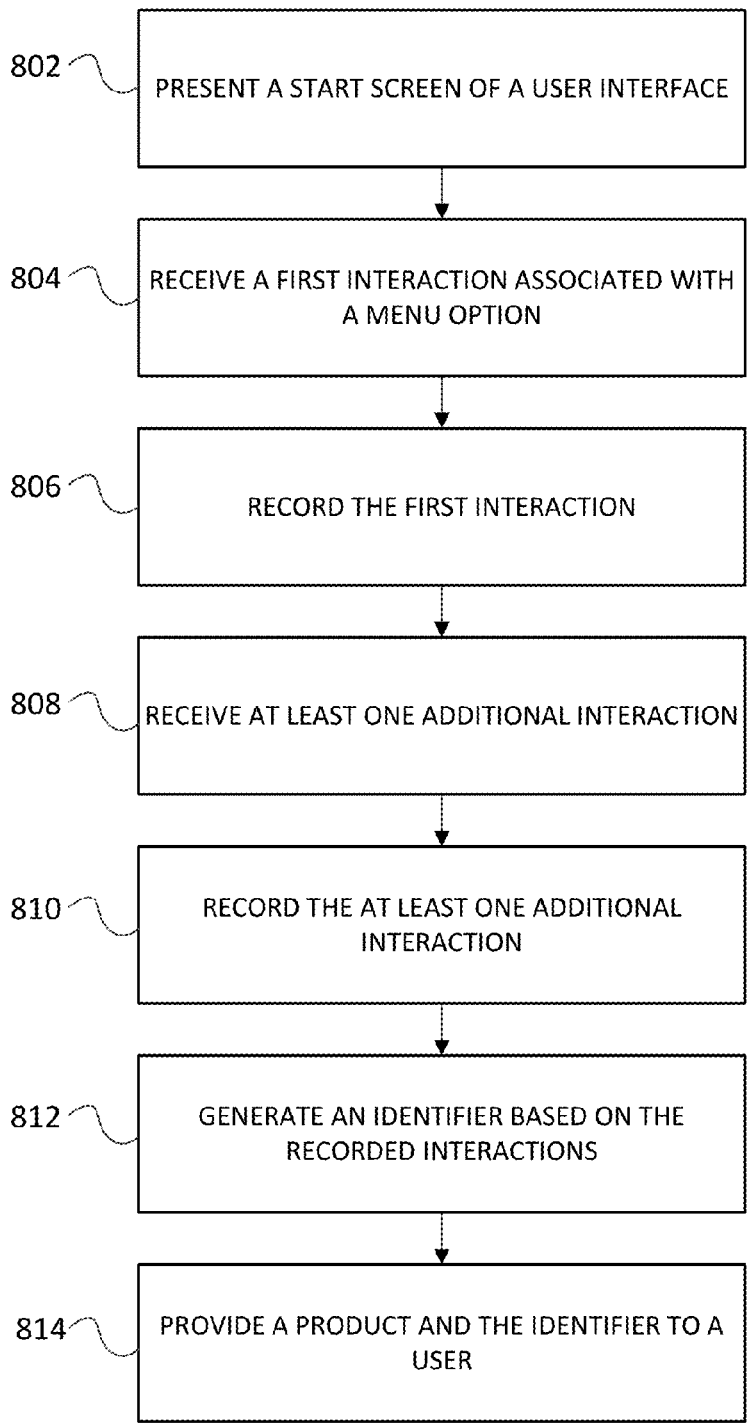
FIG. 8 depicts a process for generating a barcode or other identifier for a vending machine product according to embodiments.

FIG. 8 depicts a process 800 for dispensing products from a vending machine is provided. Process 800 may be performed by a vending machine, such as vending machine 100 and may be similar to process 200 described herein. Process 800 may also utilize the decision tree of FIG. 4 and/or one or more of the screens described in FIGS. 5-7. Process 800, in addition to dispensing a product from a vending machine, generates an identifier, such as a barcode that enables more efficient selection of the same product in a subsequent transaction. Process 800 may begin by presenting a start screen of a user interface on display of a vending machine at block 802. The start screen may include menu options associated with a selection of a product to be purchased, such as in start screen 500. At block 804, the vending machine may receive a first interaction associated with the menu options of the start screen. For example, a user may select a one-zone fare button, and a corresponding identifier may be received. This interaction may be recorded by the vending machine for use in generating an identifier at block 806. The vending machine may receive at least one additional interaction at block 808. Each of the at least one interaction may correspond to a selection made a unique sub menu of a plurality of sub menus. The at least one additional interaction may be associated with the selection of the product. As just one non-limiting example, the additional interactions may include a selection of a number of riders, a type of riders, a payment type, and/or other selection associated with a particular product. A last interaction of the at least one additional interaction may determine the product to be purchased.

At block 810, these additional interactions may be recorded by the vending machine for use in generating the identifier. The vending machine may then generate an identifier based on the recorded first interaction and the recorded additional interactions at block 812. The identifier may represent a sequential mapping of the first interaction and the at least one additional interaction. For example, the sequential mapping may be a string of identifier bits as described in FIG. 4. In some embodiments, the identifier may be, or may be represented by, a barcode, QR code, or other machine readable symbolic data element. In some embodiments, the vending machine may determine that at least one of the additional interactions is for a backup command. The vending machine may then truncate the generated identifier to remove any of the additional interactions that correspond or relate to the backup command. For example, an identifier bit associated with the backup command and an immediately preceding command may be removed from the identifier.

The product and the identifier may be provided to a user of the vending machine at block 814. In some embodiments, the product may be a fare media. In such instances, providing the product to the user may include communicates a first data packet that contains the fare media to a user's mobile device or smart card. In some embodiments, the identifier may be a second data packet that is communicated to the mobile device or smart card. This second data packet may cause the identifier, such as a barcode and/or QR code, to be displayed on a display of the mobile device for redemption purposes and/or may be a data packet that is communicable to the vending machine during a subsequent transaction. For example, the second data packet may be communicable over NFC, RFID, Bluetooth®, and/or other wireless communication with the vending machine. In other embodiments, the transit fare may be a hard copy ticket. In such cases the identifier may be printed on the physical ticket. For example, a barcode or QR code could be printed on the ticket. In other embodiments, the vending machine may print a receipt with the identifier and provide the printed receipt to the user. In other embodiments, the identifier could be provided to the user using email, SMS, and/or other messaging systems.

Figure 9:
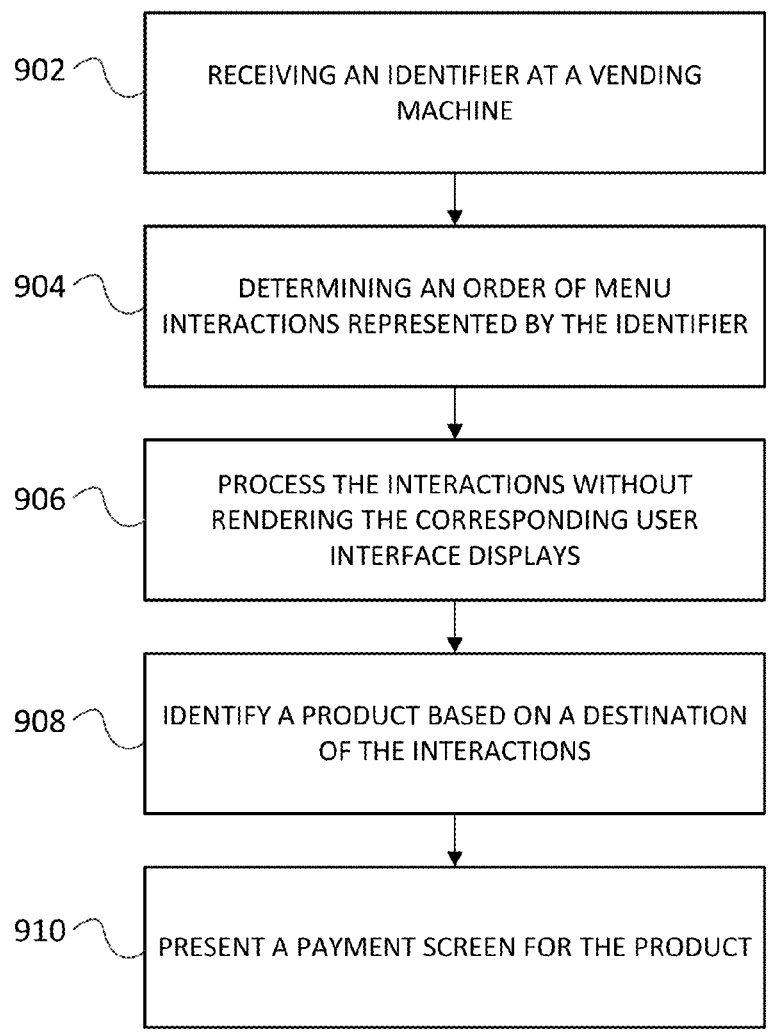
FIG. 9 depicts a process for redeeming a barcode or other identifier for a product at a vending machine according to embodiments.

FIG. 9 depicts a process 900 for dispensing products from a vending machine is provided. Process 900 may be performed by a vending machine, such as vending machine 100 and may be similar to process 300 described herein. Process 900 may also utilize the decision tree of FIG. 4. Process 900 utilizes an identifier, such as the identifier generated in process 800, to more quickly and efficiently help a user navigate the product selection process to purchase a desired product. In some embodiments, process 900 may be a standalone process, while in other embodiments, it may be performed as part of process 800. Process 900 may begin with the vending machine receiving an identifier at block 902. The identifier may be read with a barcode and/or QR code scanner and/or may be received as an electronic data packet, such as over an NFC, RFID, Bluetooth®, and/or other wireless communications interface. The identifier may have been generated previously using the vending machine, or another vending machine having a similar menu structure. The identifier may include a string of identifier bits that each represent a separate interaction by the user during a previous transaction. The vending machine may then determine an order of interactions represented by the identifier at block 904. This may be done by parsing the identifier and looking at the individual identifier bits, where each bit corresponds to a particular ordered interaction with the vending machine.

At block 906, the vending machine may process interactions matching the first interaction (matching the first identifier bit in the string) and then each additional interaction or additional identifier bit may be processed. Thus, the vending machine uses the string of identifier bits to emulate the user's previous interactions with the vending machine. By emulating these interactions, the user does not have to enter the information again, and the vending machine does not have to load and render display data corresponding to each sub menu screen. This increases the processing efficiency of the vending machine by reducing the amount of information that is processed by the vending machine processor. At block 908, the vending machine may identify the product based on the processed interactions. For example, the string of identifier bits may be processed, such as done using the decision tree of FIG. 4 to identify the previously purchased product. At this point, a payment screen for the product may be represented on the display of the vending machine at block 910. A payment for the product may then be received and processed, and the product may be dispensed. In some embodiments, the identifier may be reissued to the user. In some embodiments, the user may request an additional and/or alternative issuance of the identifier. For example, the user may not wish to carry a paper receipt with the identifier and may request that the vending machine email him a copy of the identifier for subsequent use. The vending machine may provide the user with a selection of a number of identifier delivery options, such as including the identifier on the product, a receipt, email, SMS, NFC data packet, and the like.

In some embodiments, the user, in the previous transaction, may have provided an input to enable automatic payments with a particular payment media. For example, a mobile wallet may be stored on a mobile device of the user. The identifier may include an identifier bit indicating that a particular payment media of the mobile wallet application may be used in automatic payments. The identifier may then be communicated to the mobile device. In some embodiments, this identifier may be provided to the mobile wallet application. The user may provide the identifier to the vending machine, which may recognize the identifier bit associated with automatic payment, and may then process a payment from an account of the mobile wallet application while the user's mobile device is still within scanning range. In such embodiments, the vending machine may skip providing a payment screen and instead, may present a confirmation screen and issue to the product and/or the identifier.

In some embodiments, a process similar to process 800 may be performed on a user's computer, mobile device, and/or other computing device remote from the vending machine. For example, a web browser, mobile application, and/or other software application may be provided by an operator of the vending machine that emulate the menu selection process of the vending machine on the remote device. This allows a user to traverse the menu without standing in line, and where the user may have access to additional information. For example, a user unfamiliar with a particular city may want maps and other data available when selecting a transit product for purchase. The user may spend as much time researching the correct transit product, without tying up a vending machine and increasing a wait time for others, all while making it more likely that he can select the proper product.

Similarly, an event coordinator may use such menu emulation to select products for other users. For example, an event coordinator for a hotel during Super Bowl™ week may use the software to select a product, and thus generate an identifier, for a single person transit fare from a transit stop near the hotel to the football stadium. People staying at the hotel may be provided with a printed and/or electronic version of the identifier such that they can easily get to the stadium without the hassle of learning the transit system stops and fare types. Each person may have their identifier read by a transit fare vending machine and be presented with a payment screen for the particular transit fare using a process similar to process 900. In some embodiments, a discount rate may be negotiated by the hotel or other entity. In such instances, an identifier bit associated with a particular discount rate may be included in the identifier such that the discounted rate is accounted for just by scanning the identifier at the vending machine.

Figure 10:
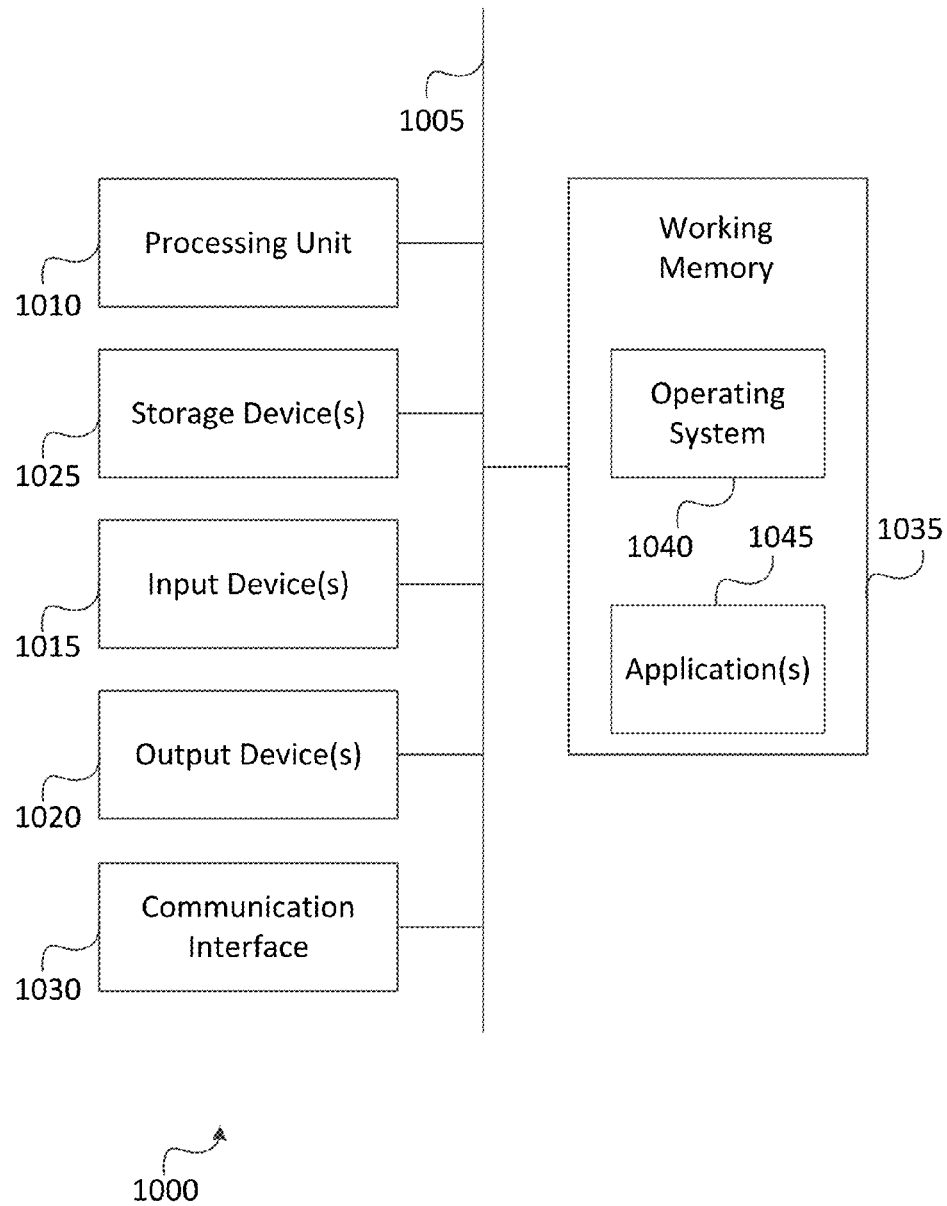
FIG. 10 depicts computer system according to embodiments.

A computer system as illustrated in FIG. 10 may be incorporated as part of the previously described computerized devices. For example, computer system 1000 can represent some of the components of the vending machines and/or mobile devices described herein. FIG. 10 provides a schematic illustration of one embodiment of a computer system 1000 that can perform the methods provided by various other embodiments, as described herein. FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include a processing unit 1010, including without limitation one or more general-purpose processors and/or one or more special-purpose processors (such as digital signal processing chips, graphics acceleration processors, and/or the like); one or more input devices 1015, which can include without limitation a keyboard, a touchscreen, receiver, a motion sensor, a camera, a smartcard reader, a contactless media reader, and/or the like; and one or more output devices 1020, which can include without limitation a display device, a speaker, a printer, a writing module, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communication interface 1030, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1010, applications 1045, etc.) Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processing unit 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processing unit 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processing unit 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication interface 1030 (and/or the media by which the communication interface 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a non-transitory storage device 1025 either before or after execution by the processing unit 1010.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for dispensing products from a vending machine, the method comprising:
    presenting a start screen of a user interface on display of a vending machine, the start screen comprising menu options associated with a selection of a product to be purchased;
    receiving, at the vending machine, a first interaction associated with the menu options of the start screen;
    recording, at the vending machine, the first interaction for use in generating an identifier;
    receiving, at the vending machine, at least one additional interaction, each of the at least one interaction corresponding to a selection made a unique sub menu of a plurality of sub menus, the at least one additional interaction being associated with the selection of the product, wherein a last interaction of the at least one additional interaction determines the product to be purchased;
    recording, at the vending machine, each of the a least one additional interaction for use in generating the identifier;
    generating, by the vending machine, an identifier based on the recorded first interaction and the recorded at least one additional interaction, the identifier representing a sequential mapping of the first interaction and the at least one additional interaction; and
    providing the product and the identifier to a user of the vending machine.

2. The method for dispensing products from a vending machine of claim 1, further comprising:
    receiving the identifier at the vending machine;
    determining an order of interactions represented by the identifier;
    processing interactions matching the first interaction and the at least one additional interaction without rendering corresponding displays for the one or more sub menus;
    identifying the product based on the processed interactions; and
    presenting a payment screen for the product on the display of the vending machine.

3. The method for dispensing products from a vending machine of claim 1, wherein:
    the identifier comprises one or more of a barcode or a QR code.

4. The method for dispensing products from a vending machine of claim 1, wherein:
    the product comprises a fare media; and
    providing the product to the user comprises communicating a first data packet comprising the fare media to a mobile device or a smart card.

5. The method for dispensing products from a vending machine of claim 4, wherein:
    the identifier comprises a second data packet that is storable on a memory of the mobile device or the smart card.

6. The method for dispensing products from a vending machine of claim 1, wherein:
    providing the identifier to the user comprises printing the identifier on a receipt and issuing the receipt to the user.

7. The method for dispensing products from a vending machine of claim 1, wherein:
    the product comprises a fare media; and
    the identifier is printed on the fare media.

8. A non-transitory computer-readable medium having instructions embedded thereon for dispensing products from a vending machine, the instructions comprising computer code for causing a computing device to:
    present a start screen of a user interface on display of a vending machine, the start screen comprising menu options associated with a selection of a product to be purchased;
    receive, at the vending machine, a first interaction associated with the menu options of the start screen;
    record, at the vending machine, the first interaction for use in generating an identifier;
    receive, at the vending machine, at least one additional interaction, each of the at least one interaction corresponding to a selection made a unique sub menu of a plurality of sub menus, the at least one additional interaction being associated with the selection of the product, wherein a last interaction of the at least one additional interaction determines the product to be purchased;
    record, at the vending machine, each of the a least one additional interaction for use in generating the identifier;
    generate, by the vending machine, an identifier based on the recorded first interaction and the recorded at least one additional interaction, the identifier representing a sequential mapping of the first interaction and the at least one additional interaction; and
    provide the product and the identifier to a user of the vending machine.

9. The non-transitory computer-readable medium of claim 8, further comprising instructions for causing the computing device to:
    receive the identifier at the vending machine;
    determine an order of interactions represented by the identifier;
    process interactions matching the first interaction and the at least one additional interaction without rendering corresponding displays for the one or more sub menus;
    identify the product based on the processed interactions; and
    present a payment screen for the product on the display of the vending machine.

10. The non-transitory computer-readable medium of claim 8, wherein:
    the identifier comprises one or more of a barcode or a QR code.

11. The non-transitory computer-readable medium of claim 8, wherein:
    the product comprises a printed ticket having the one or more of the barcode or the QR code printed thereon.

12. The non-transitory computer-readable medium of claim 8, wherein:
providing the product and the identifier to the user comprises communicating the identifier to a mobile device; and
the identifier comprises one or more of the barcode or QR code that is displayable on a screen of the mobile device.

13. The non-transitory computer-readable medium of claim 8, further comprising instructions for causing the computing device to:
receive the identifier at the vending machine along with a payment from a mobile wallet application of a mobile device;
determine an order of interactions represented by the identifier;
process interactions matching the first interaction and the at least one additional interaction without rendering corresponding displays for the one or more sub menus;
identify the product based on the processed interaction;
process the payment; and
issue the product.

14. The non-transitory computer-readable medium of claim 8, further comprising instructions for causing the computing device to:
determine the at least one additional interaction comprises a backup command; and
truncating the generated identifier to remove any of the at least one additional interaction that corresponds to a backup command.

15. A vending machine, comprising:
a display;
a user interface presented on the display screen;
a memory; and
a processor configured to:
present a start screen of the user interface, the start screen comprising menu options associated with a selection of a product to be purchased;
receive a first interaction associated with the menu options of the start screen;
record the first interaction for use in generating an identifier;
receive at least one additional interaction, each of the at least one interaction corresponding to a selection made a unique sub menu of a plurality of sub menus, the at least one additional interaction being associated with the selection of the product, wherein a last interaction of the at least one additional interaction determines the product to be purchased;
record each of the a least one additional interaction for use in generating the identifier;
generate an identifier based on the recorded first interaction and the recorded at least one additional interaction, the identifier representing a sequential mapping of the first interaction and the at least one additional interaction;
at a first time, provide the product and the identifier to a user of the vending machine;
receive, at a second time, the identifier at the vending machine;
determine an order of interactions represented by the identifier;
process interactions matching the first interaction and the at least one additional interaction without rendering corresponding screens for the one or more sub menus; and
identify the product based on the processed interactions.

16. The vending machine of claim 15, wherein the processor is further configured to:
present a payment screen for the identified product on the display of the vending machine.

17. The vending machine of claim 15, wherein the processed is further configured to:
receive an input indicating that automatic payments from a mobile wallet application of the mobile device for subsequent purchases of the product are enabled, wherein the identifier comprises an indication that the automatic payments are enabled, and wherein the identifier is provided to the mobile device;
receive, at the second time, a payment from the mobile wallet application;
process the payment without presenting a payment confirmation screen; and
issue the identified product.

18. The vending machine of claim 15, further comprising:
a reader device configured to read the identifier.

19. The vending machine of claim 15, wherein:
the reader device comprises one or more of a barcode reader, a QR code reader, an NFC antenna, or a Bluetooth antenna.

20. The vending machine of claim 15, further comprising:
a printer for producing one or both of the product or a receipt.

* * * * *